United States Patent [19]

Kobayashi et al.

[11] Patent Number: 5,140,958
[45] Date of Patent: Aug. 25, 1992

[54] TWO-STROKE ENGINE

[75] Inventors: Tatsuo Kobayashi, Susono; Norihiko Nakamura; Kenichi Nomura, both of Mishima; Hiroshi Nomura; Hiroaki Nihei, both of Susono, all of Japan

[73] Assignee: Toyota Jidosha Kabushiki Kaisha, Aichi, Japan

[21] Appl. No.: 716,652

[22] Filed: Jun. 14, 1991

[30] Foreign Application Priority Data

Jun. 27, 1990 [JP] Japan .................. 2-166881
Oct. 23, 1990 [JP] Japan .................. 2-283279

[51] Int. Cl.⁵ .................. F02B 23/10; F02B 25/20
[52] U.S. Cl. .................. 123/276; 123/302; 123/65 VD; 123/299
[58] Field of Search .......... 123/257, 276, 302, 65 VD, 123/279, 260, 299

[56] References Cited

U.S. PATENT DOCUMENTS

| 4,840,147 | 6/1989 | Tanahashi et al. | 123/65 VD |
|---|---|---|---|
| 4,920,937 | 5/1990 | Sasaki et al. | 123/305 |
| 4,958,604 | 9/1990 | Hashimoto | 123/276 |
| 4,995,348 | 2/1991 | Melchior | 123/65 VD |

FOREIGN PATENT DOCUMENTS

| 0299385 | 1/1989 | European Pat. Off. . |
|---|---|---|
| 3903842 | 9/1989 | Fed. Rep. of Germany . |
| 2338385 | 8/1977 | France . |
| 61-173728 | 10/1986 | Japan . |
| 63-40527 | 3/1989 | Japan . |
| 1-124042 | 8/1989 | Japan . |
| 1-203613 | 8/1989 | Japan . |
| 2-16360 | 1/1990 | Japan . |
| 2-28526 | 2/1990 | Japan . |
| 2-49923 | 2/1990 | Japan . |
| 2-125911 | 5/1990 | Japan . |
| 2-169834 | 6/1990 | Japan . |
| 723972 | 2/1955 | United Kingdom . |
| WO87/03043 | 5/1987 | World Int. Prop. O. . |

OTHER PUBLICATIONS

Patent Abstracts of Japan, vol. 12, No. 039 (M-665) Feb. 5, 1988 & JP-A-62-191622.

Primary Examiner—Andrew M. Dolinar
Attorney, Agent, or Firm—Oliff & Berridge

[57] ABSTRACT

A two-stroke engine including a pair of intake valves. A masking wall is provided for each intake valve to mask the valve opening between the valve seat and the peripheral portion of the intake valve, which is located on the exhaust valve side, for the entire time for which the intake valve is open. The exhaust valves open earlier than the intake valves, and the exhaust valves and the intake valves are closed at substantially the same time.

19 Claims, 14 Drawing Sheets

TWO-STROKE ENGINE

BACKGROUND OF THE INVENTION

1. Field of the Invention

The present invention relates to a two-stroke engine.

2. Description of the Related Art

Figure 10:
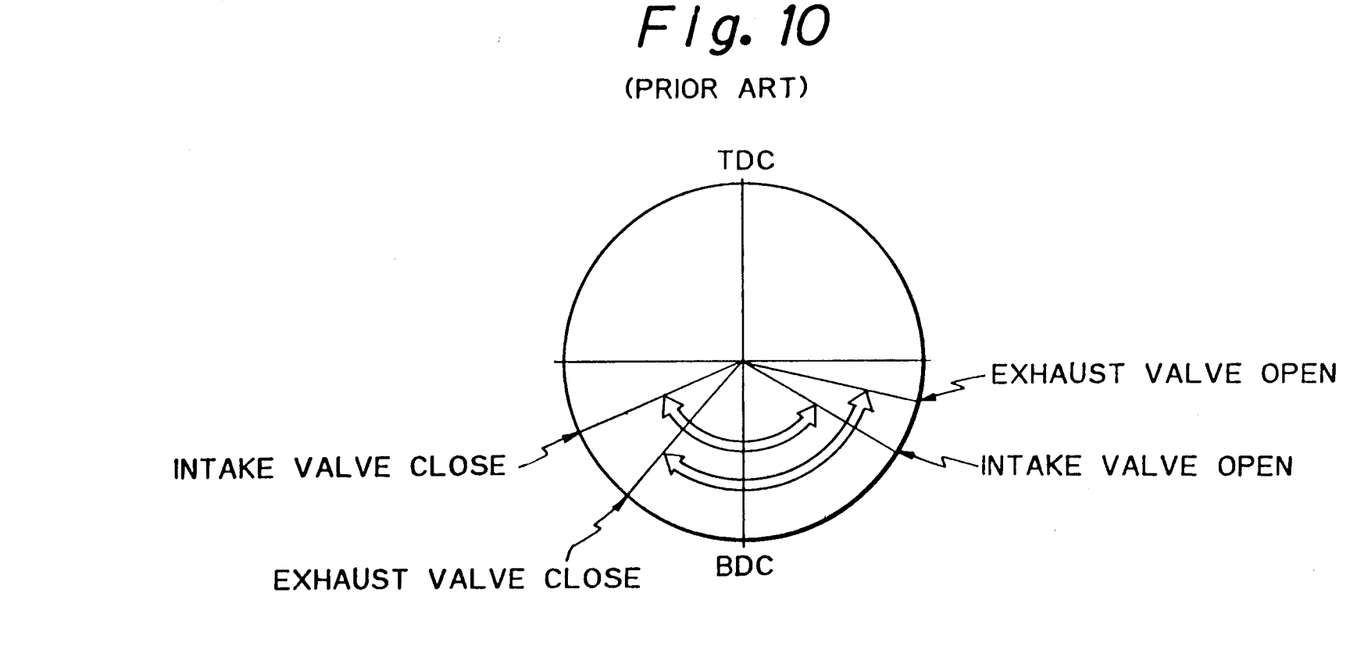
FIG. 10 is a diagram illustrating the opening time of an intake valve and an exhaust valve of a prior art engine.

In a known two-stroke engine, the valve opening of the intake valve, which is located on the exhaust valve side, is masked by the masking wall for the entire time for which the intake valve is open, and air discharged from the mechanically driven supercharger flows into the combustion chamber via the valve opening of the intake valve, which is located on the opposite side of the exhaust valve, and thus a loop scavenging operation is carried out (see Japanese Unexamined Patent Publication No. 2-49923). In this two-stroke engine, as illustrated in FIG. 10, the exhaust valves open earlier than the intake valves, and the exhaust valves close earlier than the intake valves Namely, in this two-stroke engine, the intake valves open after the exhaust valves open to feed air into the engine cylinder after a blow down of the burned gas, i.e. an abrupt discharge of the burned gas, occurs. Further, the intake valves are closed after the exhaust valves are closed to feed air discharged from the mechanically driven supercharger into the engine cylinder after the exhaust valves are closed. In practice, however, when the exhaust valves are closed, and accordingly, the discharge of the burned gas is stopped, the inflow of air into the engine cylinder is also stopped, and if the intake valves remain open thereafter, air or burned gas in the engine cylinder is forced into the intake ports via the intake valves, due to the upward movement of the piston.

If air flows within the combustion chamber in a loop manner, a swirl motion is created in the combustion chamber. This swirl motion is gradually strengthened during the time for which air is fed into the engine cylinder via the intake valves, and an attenuation of the swirl motion begins when the inflow of air into the engine cylinder is stopped. If the intake valves are open after the exhaust valves are closed, however, since a part of the swirling air or the swirling burned gas is forced into the intake ports as mentioned above, the swirl motion is abruptly attenuated, and as a result, a problem occurs in that it is impossible to sufficiently promote the vaporization of fuel fed into the engine cylinder and to obtain a stable combustion by increasing the burning speed due to the swirl motion.

SUMMARY OF THE INVENTION

An object of the present invention is to provide a two-stroke engine capable of maintaining as strong a swirl motion as possible.

According to the present invention, there is provided a two-stroke engine comprising: a cylinder head having an inner wall; a piston having a top face, the inner wall of the cylinder head and the top face of the piston defining a combustion chamber therebetween; an intake valve arranged on the inner wall of the cylinder head; an exhaust valve arranged on the inner wall of the cylinder head; drive means for driving the intake valve and the exhaust valve to open the exhaust valve earlier than the intake valve and close the exhaust valve and the intake valve substantially at the same time; a masking wall formed on the inner wall of the cylinder head between the intake valve and the exhaust valve to mask a valve opening of the intake valve, which is located on the exhaust valve side; a fuel injector arranged on the inner wall of the cylinder head to inject fuel into the combustion chamber; and control means for controlling the injecting operation of the fuel injector.

The present invention may be more fully understood from the description of preferred embodiments of the invention set forth below, together with the accompanying drawings.

DESCRIPTION OF THE PREFERRED EMBODIMENTS

Figure 1:
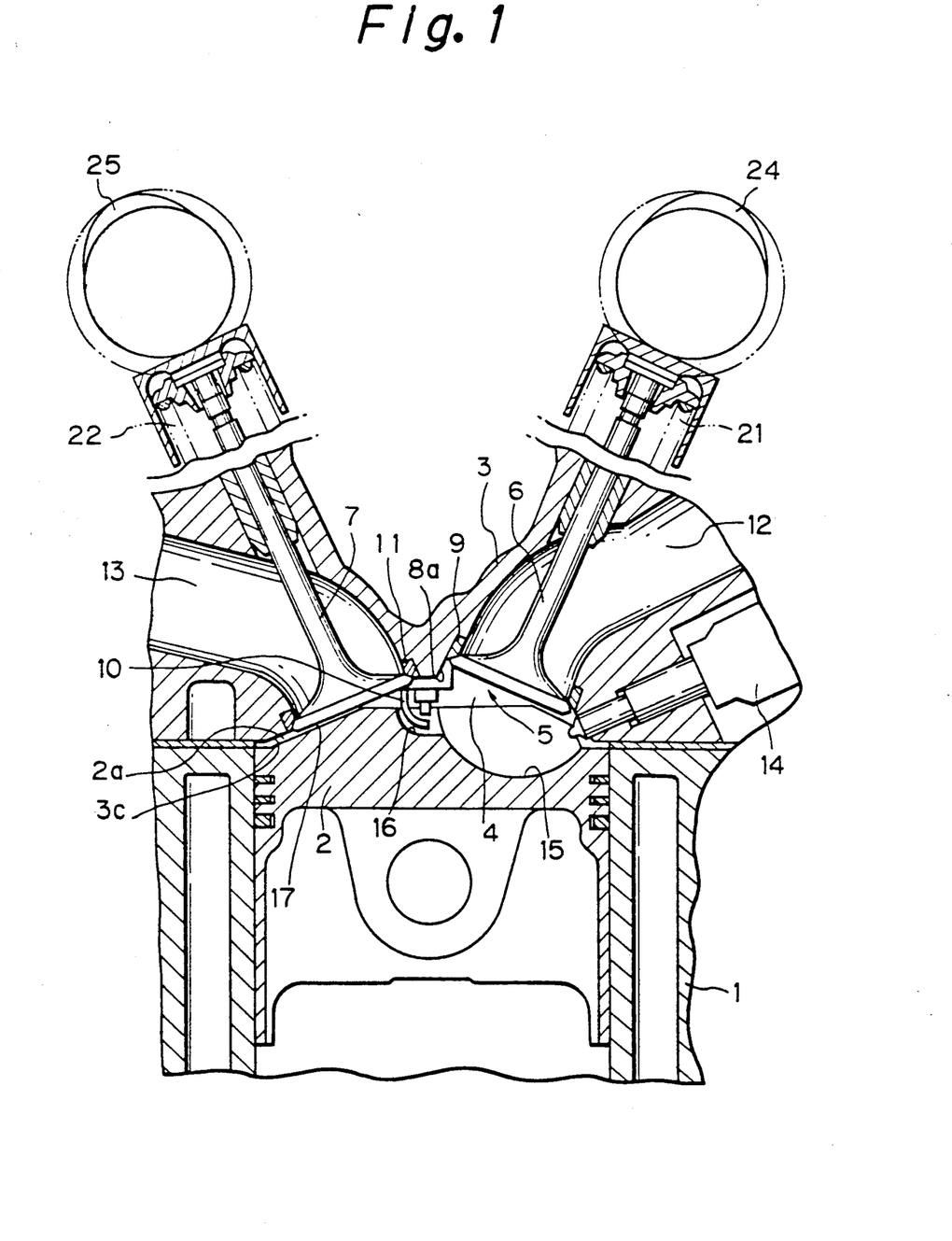
FIG. 1 is a cross-sectional side view of a two-stroke engine.
Figure 2:
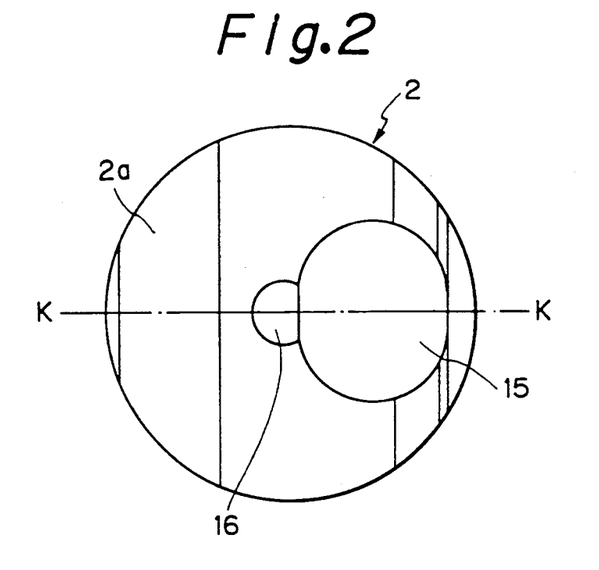
FIG. 2 is a plan view of a piston.
Figure 3:
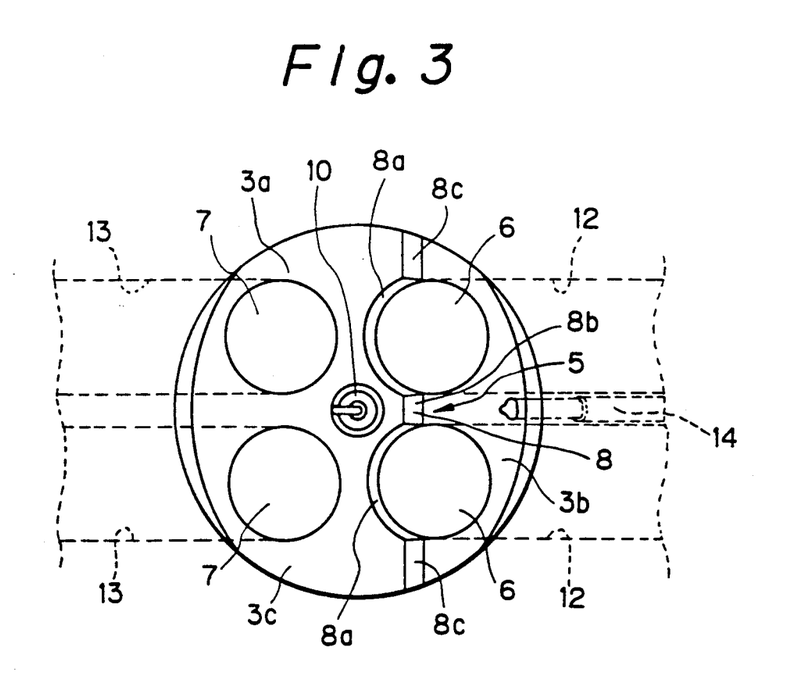
FIG. 3 is a view illustrating an inner wall of a cylinder head.

Referring to FIGS. 1 through 3, reference numeral 1 designates a cylinder block, 2 a piston reciprocally movable in the cylinder block 1, 3 a cylinder head fixed onto the cylinder block 1, and 4 a combustion chamber formed between the inner wall 3a of the cylinder head 3 and the top face 2a of the piston 2. A depression 5 is formed on the inner wall 3a of the cylinder head 3, and a pair of intake valves 6 are arranged on the inner wall portion 3b of the cylinder head 3, which forms the bottom wall of the depression 5. The inner wall portion 3c of the cylinder head 3 other than the depression 5 is substantially flat and inclined, and a pair of exhaust valves 7 are arranged on this inner wall portion 3c of the cylinder head 3. The inner wall portions 3b and 3c of the cylinder head 3 are interconnected via the peripheral wall 8 of the depression 5. The peripheral wall 8 of the depression 5 comprises masking walls 8a arranged as close as possible to the peripheral portions of the corresponding intake valves 6 and extending archwise along the periphery of the corresponding intake valves 6, a fresh air guide wall 8b arranged between the intake valves 6, and fresh air guide walls 8c each arranged between the circumferential wall of the inner wall 3a of the cylinder head 3 and the corresponding intake valve 6. The masking walls 8a extend toward the combustion chamber 4 to a position lower than the intake valves 6 when the valves 6 are in the maximum lift position, and thus the valve opening between the valve seat 9 and the peripheral portion of the intake valve 6, which is located on the exhaust valve side, is masked by the corresponding masking wall 8a for the entire time for which the intake valve 6 is open. The fresh air guide wall 8b and the fresh air guide walls 8c are located on substantially the same plane and extend substantially in parallel to the line passing through the centers of the intake valves 6. The spark plug 10 is arranged on the inner wall portion 3c of the cylinder head 3 in such a manner that it is located at the center of the inner wall 3a of the cylinder head 3. With respect to the exhaust valves 7, no masking walls are provided to cover the openings between the exhaust valves 7 and the valve seats 11. Therefore, when the exhaust valves 7 open, the openings formed between the exhaust valves 7 and the valve seats 11 open as a whole to the inside of the combustion chamber 4.

Intake ports 12 are formed in the cylinder head 3 for the intake valves 6, and exhaust ports 13 are formed in the cylinder head 3 for the exhaust valves 7. A fuel injector 14 is arranged at the periphery of the inner wall 3a of the cylinder head 3, between the intake valves 6, and fuel is injected from the fuel injector 14 toward the combustion chamber 4.

As illustrated in FIGS. 1 and 2, a depression 15 extending from a point beneath the spark plug 10 to a point beneath the tip portion of the fuel injector 14 is formed on the top face of the piston 2. In the embodiment illustrated in FIGS. 1 and 2, the depression 15 has a substantially spherical shape, which is symmetrical with respect to the vertical plane K—K including the spark plug 10 and the fuel injector 14. Further, a recessed portion 16 is formed on the central portion of the top face of the piston 2 and has a spherical shape having a radius of curvature which is smaller than that of the depression 15. The recessed portion 16 is also arranged in the vertical plane K—K and opens to the upper interior of the depression 15. As illustrated in FIG. 1, when the piston 2 reaches top dead center (TDC), the spark plug 10 enters the recessed portion 16. The top face portion 2a of the piston 2 positioned opposite to the depression 15 with respect to the recessed portion 16 is substantially flat and inclined so that, when the piston 2 reaches TDC as illustrated in FIG. 1, a squish area 17 is formed between the inner wall portion 3c of the cylinder head 3 and the top face portion 2a of the piston 2.

As illustrated in FIG. 1, the intake valve 6 is biased toward the closed position, due to the spring force of a compression spring 21, and is opened by a cam 24 driven by the engine. The exhaust valve 7 is also biased toward the closed position, due to the spring force of a compression spring 22, and is opened by a cam 25 driven by the engine.

Figure 4:
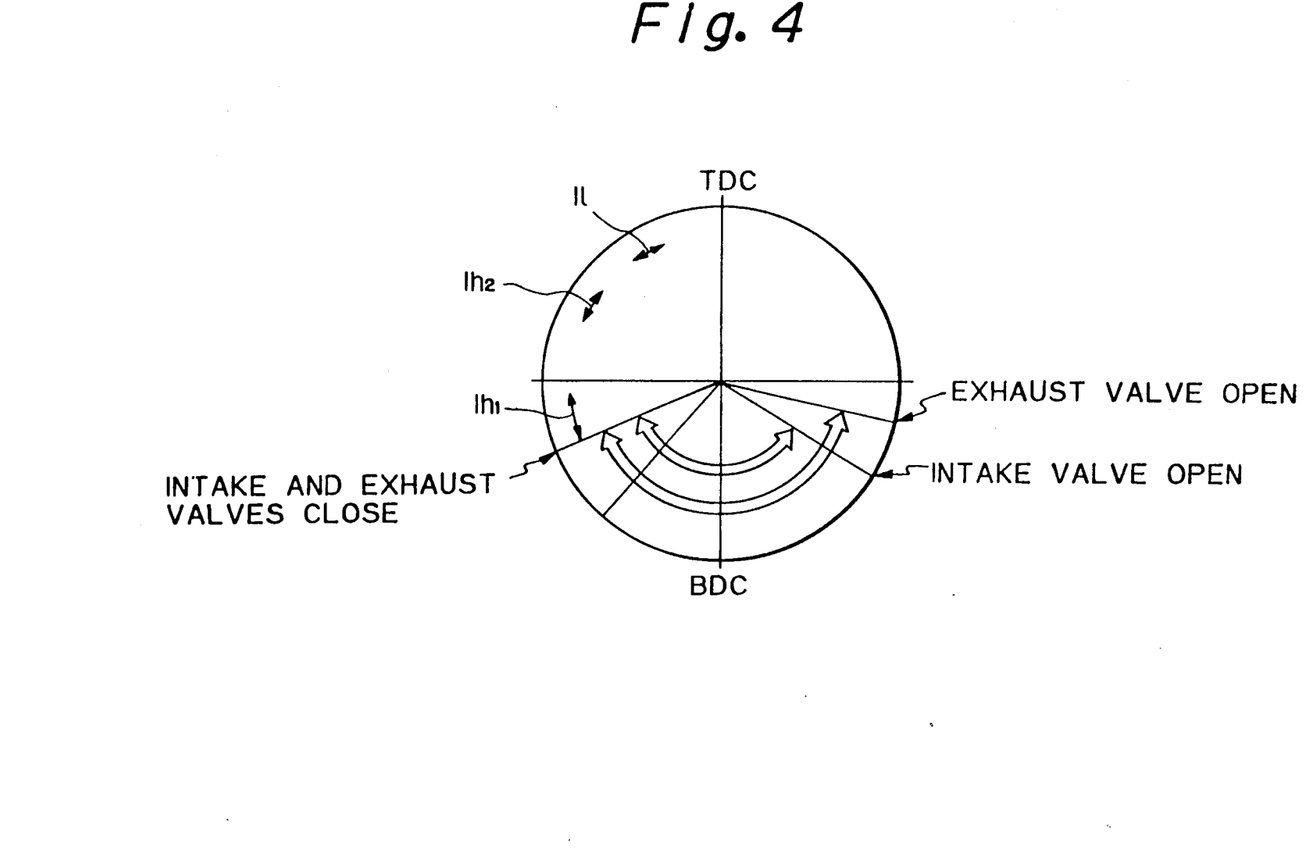
FIG. 4 is a diagram illustrating the opening time of an intake valve and an exhaust valve.

In the embodiment illustrated in FIGS. 1 through 3, as illustrated in FIG. 4, the exhaust valves 7 open earlier than the intake valves 6, and the exhaust valves 7 and the intake valves 6 are closed at substantially the same time. In addition, in FIG. 4, $I_l$ indicates the fuel injection time set when the engine is operating under a light load, and $Ih_1$ and $Ih_2$ indicate the fuel injection times set when the engine is operating under a heavy load. Consequently, it can be understood from FIG. 4 that the fuel injecting operation is carried out twice when the engine is operating under a heavy load. Furthermore, as illustrated in FIG. 4, when the engine is operating under a heavy load, the first fuel injection $Ih_1$ is carried out when the exhaust valves 7 and the intake valves 6 are closed or slightly before or after the exhaust valves 7 and the intake valves 6 are closed, and the second fuel injection $Ih_2$ is carried out during a crankangle ranging from 50 degrees before top dead center (TDC) to 80 degrees before TDC. Further, the fuel injection time $I_l$ under a light load operation of the engine is retarded with respect to the second fuel injection time $Ih_2$ under a heavy load operation of the engine.

Figure 5A:
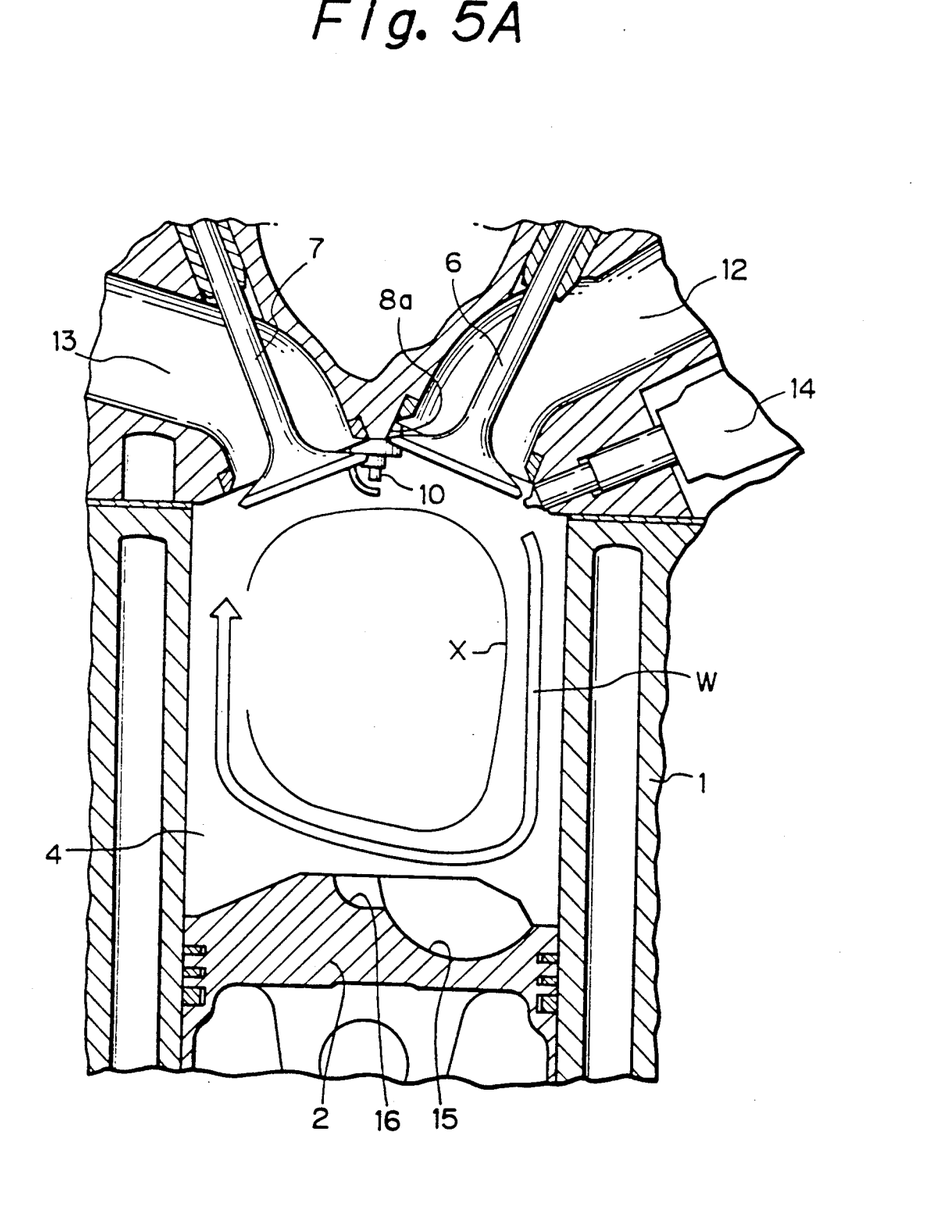
FIGS. 5A through 5F are cross-sectional side views of the engine, illustrating the operation thereof.

As illustrated in FIG. 5A, when the intake valves 6 and the exhaust valves 7 are open, fresh air flows into the combustion chamber 4 via the intake valves 6. At this time, since the valve openings of the intake valves 6, which openings are located on the exhaust valve side, are masked by the masking walls 8a, the fresh air flows into the combustion chamber 4 from the valve openings of the intake valves 6, which openings are located on the opposite side of the masking walls 8a. Then, as illustrated by the arrow W in FIG. 5A, the fresh air flows downward along the inner wall of the cylinder, located beneath the intake valves 6 and then moves forward along the top face of the piston 2 and flows upward along the inner wall of the cylinder, located beneath the exhaust valves 7. Thus, the fresh air flows within the combustion chamber 4 in the form of a loop. The burned gas in the combustion chamber 4 is discharged via the exhaust valves 7 by the air stream W flowing in the form of a loop manner, and a swirl motion X swirling in a vertical plane is created in the combustion chamber 4 by the airstream W flowing in the form of a loop. Then, the piston 2 passes through the bottom dead center (BDC) and starts to move upward. Thereafter, the exhaust valves 7 and the intake valves 6 are closed at substantially the same time. When the exhaust valves 7 and the intake valves 6 are closed at substantially the same time, as mentioned above, the swirling air swirling as illustrated by the arrow X is not forced into the intake ports 12, and thus the swirl motion X is not abruptly attenuated. As a result, the swirl motion X per se, which has been created in the combustion chamber 4, is continued as a powerful swirl. Then the intake valves 6 and the exhaust valves 7 are closed, and the injection of fuel by the fuel injector 14 is then carried out.

Figure 5B:
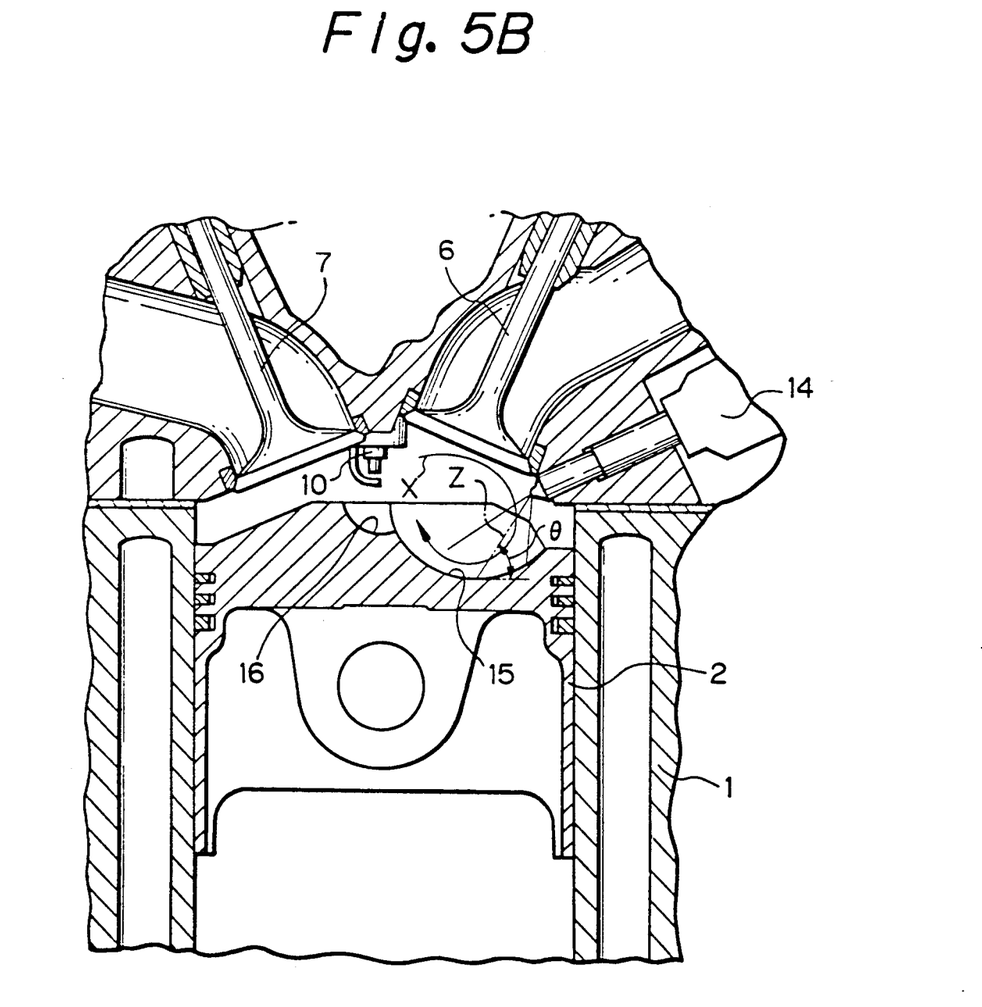
Figure 5C:
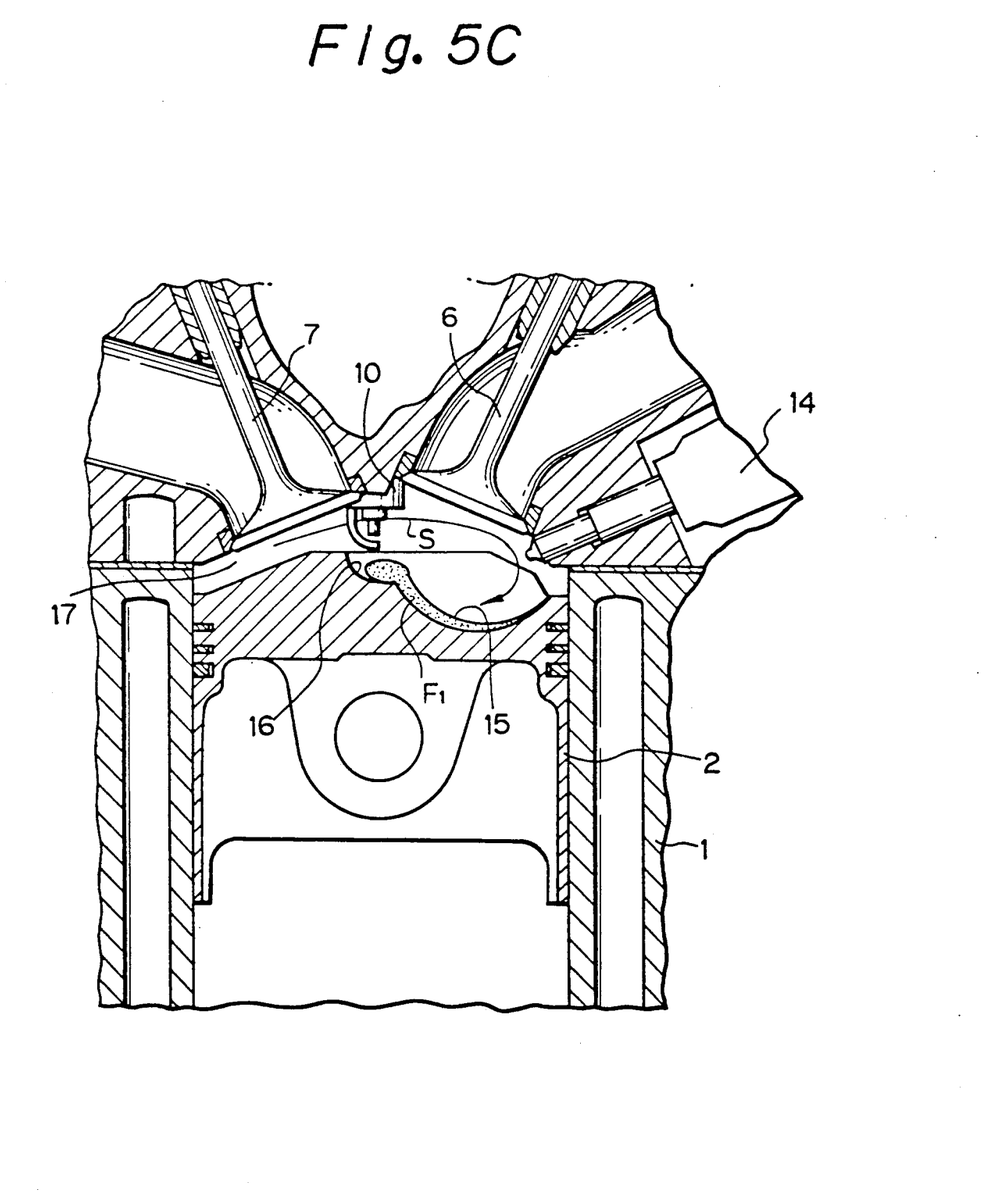
Figure 5D:
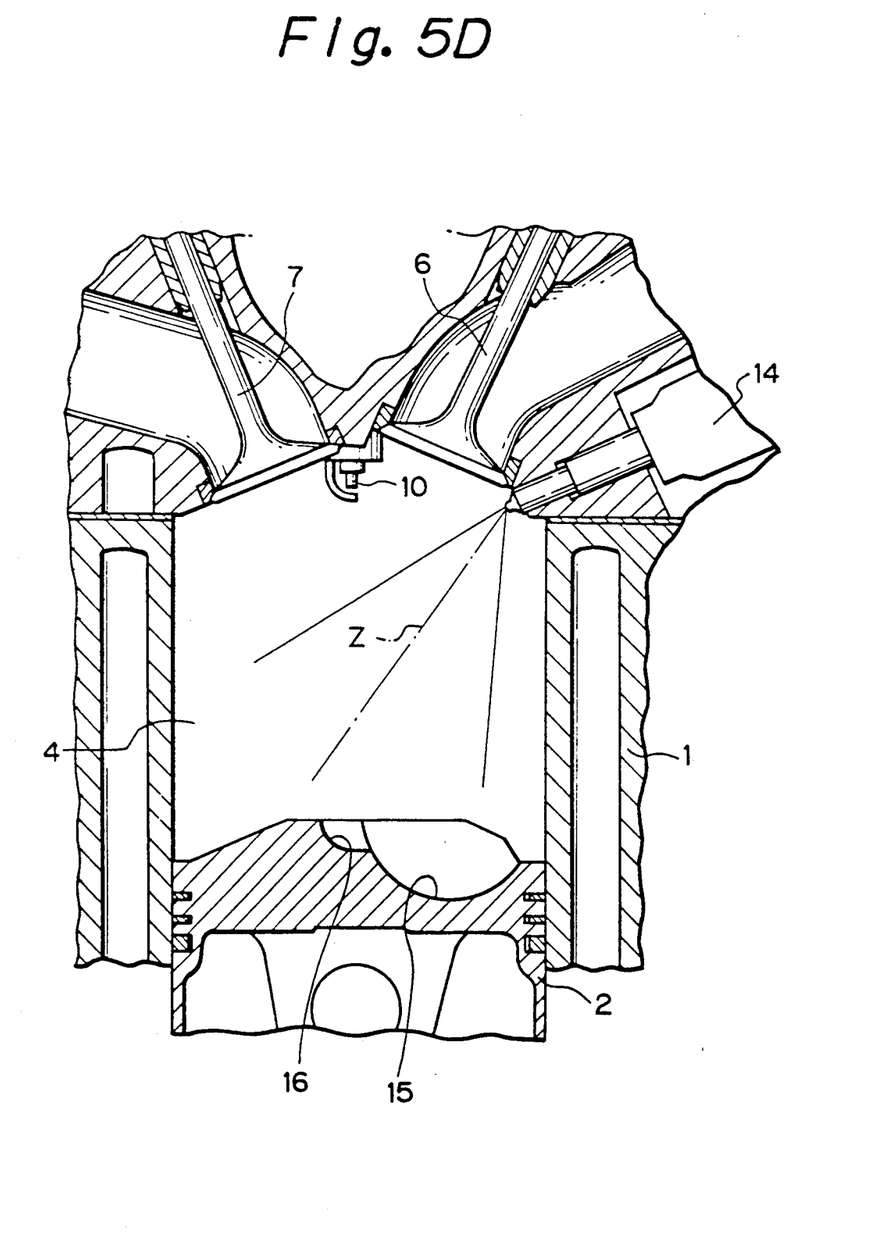
Figure 5E:
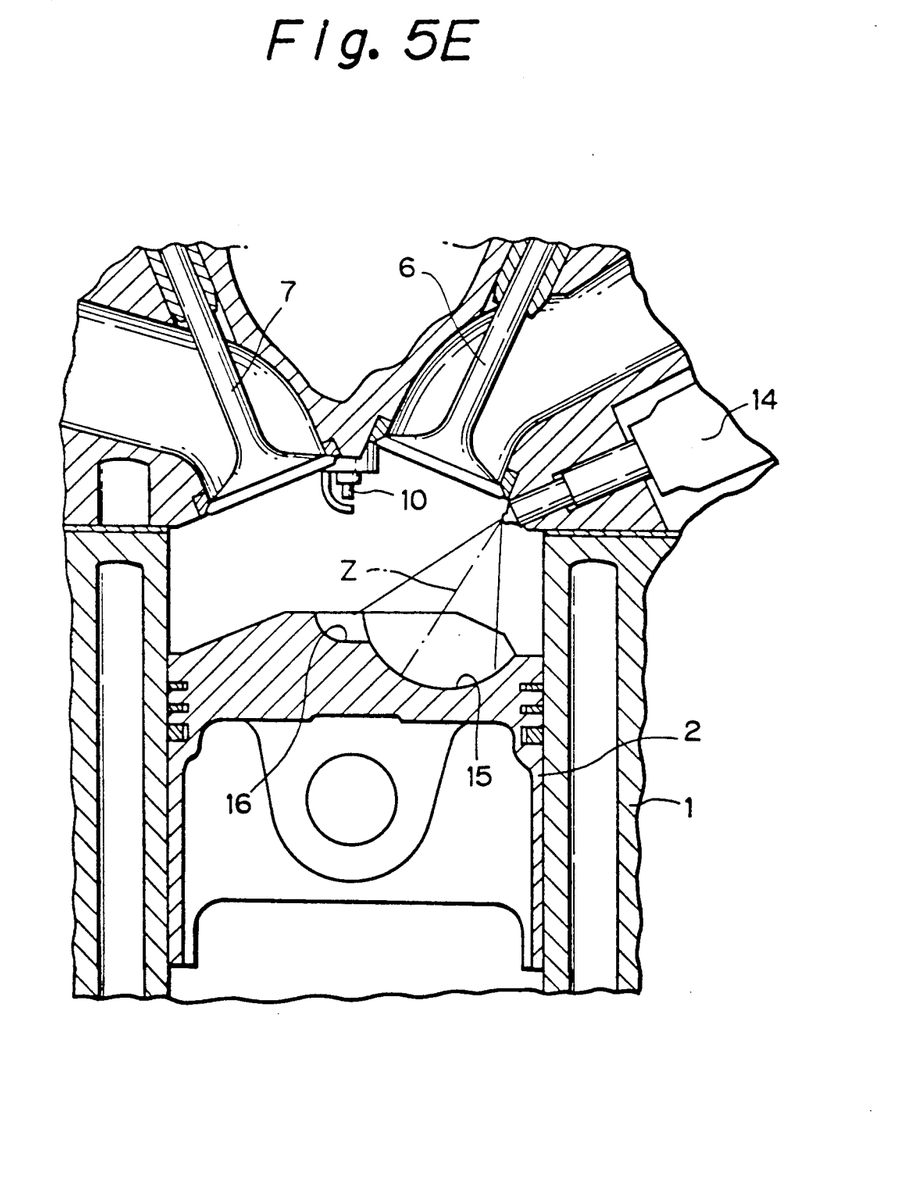
Figure 5F:
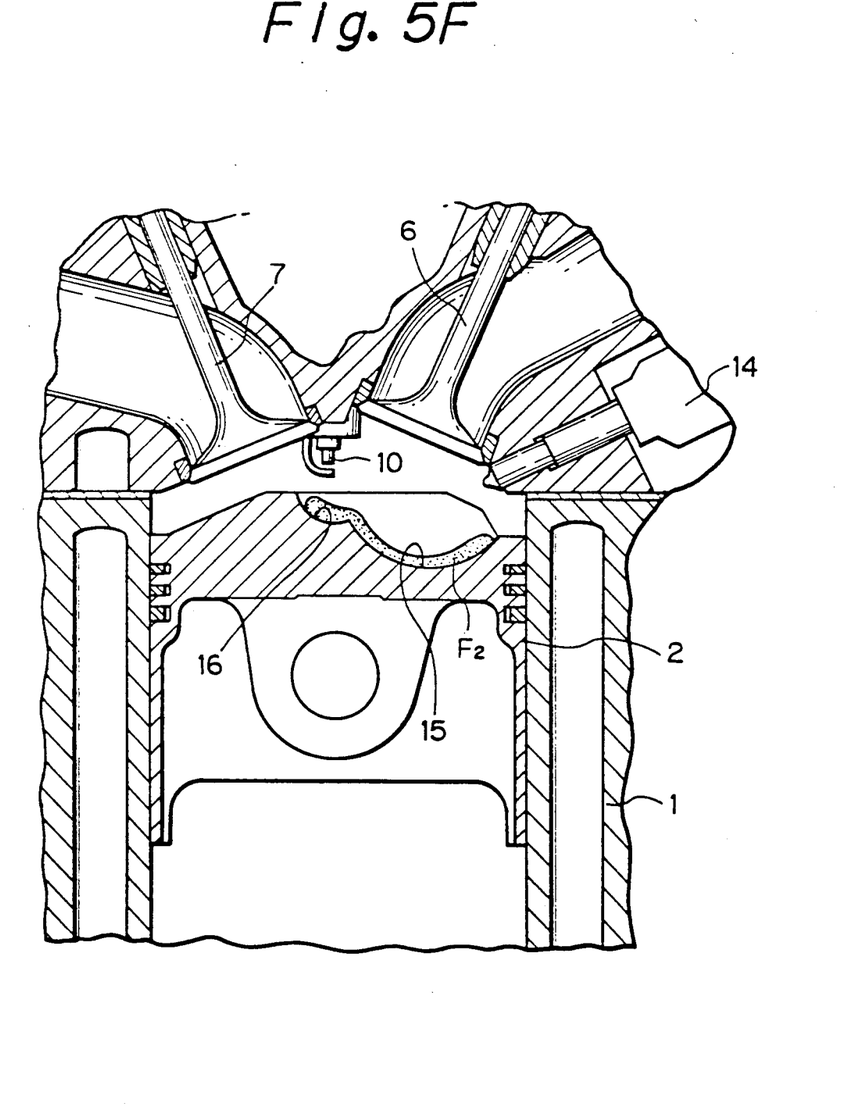

Next, the fuel injection method will be described with reference to FIGS. 5B through 5F. FIGS. 5B and 5C illustrate the case wherein the engine is operating under a light load, and FIGS. 5D, 5E and 5F illustrate the case wherein the engine is operating under a heavy load.

Fuel is injected from the fuel injector 14 toward the concaved inner wall of the depression 15, as illustrated by FIG. 5B. In the embodiment illustrated in FIGS. 1 through 3, the spray of the injected fuel has, for example, a conical shape as illustrated in FIG. 5B, and the axis of injection Z of the fuel is positioned in the vertical plane K—K illustrated in FIG. 2.

When the engine is operating under a light load, the injected fuel moving forward along the axis of injection Z impinges obliquely upon the concave inner wall of the depression 15 at an acute angle $\theta$, as illustrated by FIG. 5B. When the injected fuel impinges obliquely upon the concave inner wall of the depression 15, the fuel moves forward, while being vaporized, to the region beneath the spark plug 10 along the concave inner wall of the depression 15 due to the inertia thereof, as illustrated by the arrow $F_1$ in FIG. 5C, and the fuel is then introduced into the recessed portion 16. When the engine is operating under a light load, the amount of fuel injected by the fuel injector 14 is small, but at this time, since a large part of the injected fuel is carried to the region beneath the spark plug 10, an ignitable air-fuel mixture is formed around the spark plug 10.

In addition, the swirl motion X created in the combustion chamber 4 as illustrated in FIG. 5A is gradually attenuated, and the radius of the swirl motion X becomes smaller as the piston 2 moves upward. This swirl motion X becomes, the swirl motion X, which flows along the concave inner wall of the depression 15 as illustrated in FIG. 5B, when the piston 2 approaches TDC. Although the swirl motion X is gradually attenuated as mentioned above, since a strong swirl motion X was originally created, the swirl motion X created in the depression 15 is still very strong, and this strong swirl motion X provides the force which causes the injected fuel to move to the region beneath the spark plug 10. Furthermore, when the piston 2 moves closer to TDC, the squish flow is spouted from the squish area 17 as illustrated by the arrow S in FIG. 5C, and this squish flow S also flows along the concave inner wall of the depression 15. Consequently, this squish flow S also provides a force which causes the injected fuel to move to the region beneath the spark plug 10. Furthermore, the fuel moving to the region beneath the spark plug 10 along the concave inner wall of the depression 15 is atomized by the swirl motion X and the squish flow S, and thus an ignitable air-fuel mixture which has been fully atomized is collected around the spark plug 10. Consequently, even when the amount of fuel injected by the fuel injector 14 is small, because the engine is operating under a light load, a good ignition and a subsequent good combustion can be obtained.

As mentioned above, when the engine is operating under a heavy load, the first fuel injection $Ih_1$ is carried out slightly before or after the exhaust valves 7 are closed, and thus there is no danger that the injected fuel will escape into the exhaust ports 13 via the exhaust valves 7. In addition, as illustrated in FIG. 5D, the piston 2 is in a lower position when the first fuel injection $Ih_1$ is carried out, and thus the injected fuel is caused to impinge upon the wide range of the top face of the piston 2. At this time, the piston 2 is cooled by the injected fuel, but conversely, because the injected fuel is heated by heat from the piston 2, the vaporization of the injected fuel is promoted. Furthermore, at this time, since the strong swirl motion X as illustrated by the arrow X in FIG. 5A is created in the combustion chamber 4, the injected fuel is properly mixed with air, and since the injection time is early, sufficient time is allowed for the injected fuel to be vaporized, and accordingly, a uniform air-fuel mixture is formed in the combustion chamber 4 before the ignition by the spark plug 10 is carried out. Note, since the injection operation of fuel is carried out twice, the air-fuel mixture formed in the combustion chamber 4 by the first fuel injection $Ih_1$ is very lean, and thus a uniform but very lean air-fuel mixture is formed in the combustion chamber 4. This air-fuel mixture is heated by the residual burned gas having a high temperature, in the combustion chamber 4, but since this air-fuel mixture is very lean, the fuel density is low, and thus a self-ignition thereof can not occur. Accordingly, there is no danger that noise due to such self-ignition will be generated, and that knocking will occur.

Thereafter, as illustrated in FIG. 5E, the second fuel injection $Ih_2$ is started when the piston 2 is in a lower position, than when the engine is operating under a light load. At this time, as illustrated in FIG. 5E, the injected fuel moves forward along the axis of injection Z and impinges upon the concave inner wall of the depression 15 at substantially a right angle. When the injected fuel impinges upon the concave inner wall of the depression 15 at substantially a right angle, the fuel spreads along the concaved inner wall of the depression 15 in all directions from the point of impingement of the fuel moving along the axis of injection Z, as illustrated by $F_2$ in FIG. 5F, and in this case, a part of the fuel, which has impinged upon the concaved inner wall of the depression 15, moves to the region beneath the spark plug 10 and is then introduced into the recessed portion 16.

As mentioned above, when the amount of fuel injected by the fuel injector 14 is large, because the engine is operating under a heavy load, since a part of the injected fuel is introduced around the spark plug 10, the air-fuel mixture formed around the spark plug 10 does not become excessively rich, and thus an easily ignitable air-fuel mixture is formed around the spark plug 10. Also, when the engine is operating under a heavy load, since the injected fuel is distributed on the concaved inner wall of the depression 15, over a wide range thereof, the vaporization of the injected fuel is promoted. In addition, since the fuel injection is carried out twice, the amount of fuel injected into the depression 15 is relatively small, and thus the injected fuel is properly vaporized. Furthermore, when the engine is operating under a heavy load, both the strong swirl motion X as illustrated in FIG. 5B, and the squish flow S as illustrated in FIG. 5C, are also generated. Namely, the injected fuel $Ih_2$ is properly mixed with air by the swirl motion X and squish flow S, and thus a good combustion free from the generation of soot can be obtained.

Figure 6:
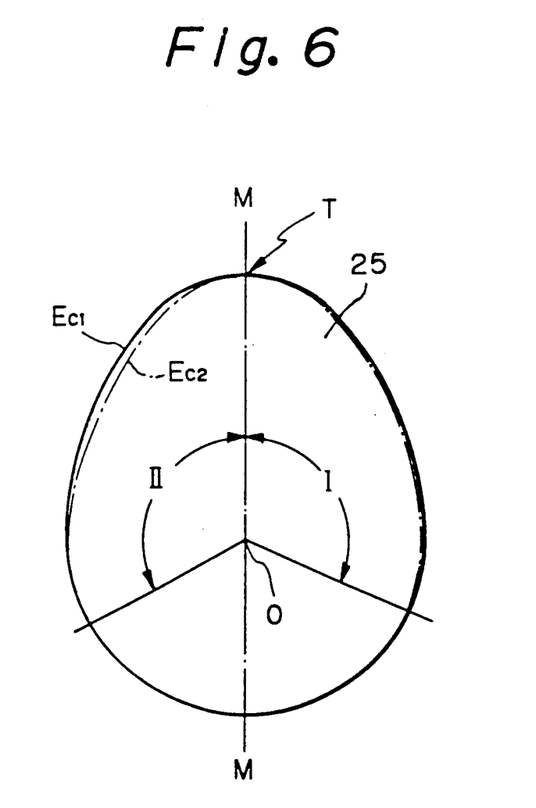
FIG. 6 is a front view of the cam.
Figure 7:
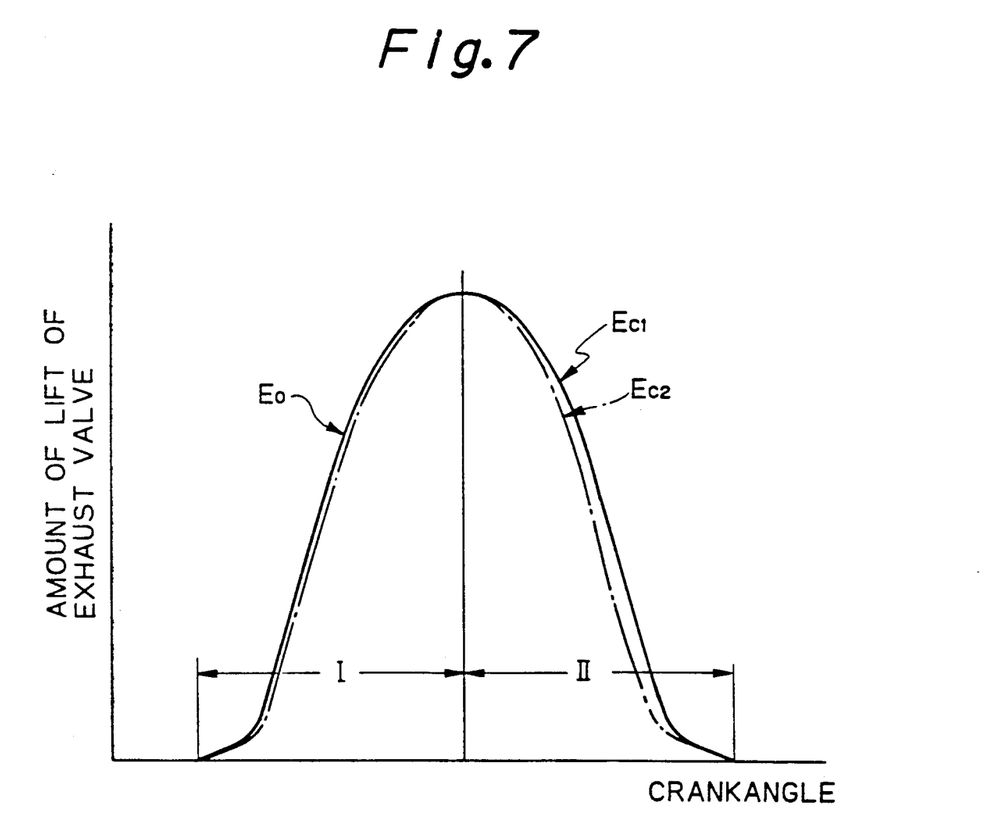
FIG. 7 is a diagram illustrating the valve lift curve of the exhaust valve.

FIG. 6 illustrates an enlarged front view of the cam 25 for the exhaust valve 7 illustrated in FIG. 1, and FIG. 7 illustrates the valve lift curve of the exhaust valve 7.

In FIG. 6, M—M indicates the line passing through the rotation axis 0 of the cam 25 and the maximum lift point T of the cam 25. In addition, the region I indicates the cam face portion used for opening the exhaust valve 7, and the region II indicates the cam face portion used for closing the exhaust valve 7. In FIG. 6, two cams 25 having different cam profiles $Ec_1$ and $Ec_2$ are depicted at the same time. One of the cams 25 having the cam profile $Ec_1$ has a cam profile which is symmetrical with respect to the line M—M. Conversely, the cam 25 having the cam profile $Ec_2$ has a cam profile which is asymmetrical with respect to the line M—M. That is, as illustrated in FIG. 6, the cam profile $Ec_2$ is the same as the cam profile $Ec_1$ in the region I, but the cam profile $Ec_2$ is located inside the cam profile $Ec_2$ in the region II. Namely, as illustrated in FIG. 7, the amount of lift of the exhaust valve 7 driven by the cam having the cam profile $Ec_2$ is smaller than that when driven by the cam having the cam profile $Ec_1$ in the region II, which is used for closing the exhaust valve 7. Note, either of the cams 25 can be used for the exhaust valve 7.

Where the cam 25 having the cam profile $Ec_2$ is used, since the amount of lift of the exhaust valve 7 becomes small when the exhaust valve 7 is closed from the maximum open position, the burned gas escapes less easily into the exhaust port 13. This means that air escapes less easily into the exhaust port 13, and thus the loss of the output power of the engine for driving the mechanically driven supercharger is reduced. In addition, this means that the pressure in the combustion chamber 4 in the compression stroke becomes high, and thus the output power of the engine is improved. Furthermore, if the amount of lift of the exhaust valve 7 becomes small when the exhaust valve 7 is closed, since the exhaust valve 7 is gently seated on the valve seat 11, any noise generated at this time is reduced.

Figure 8:
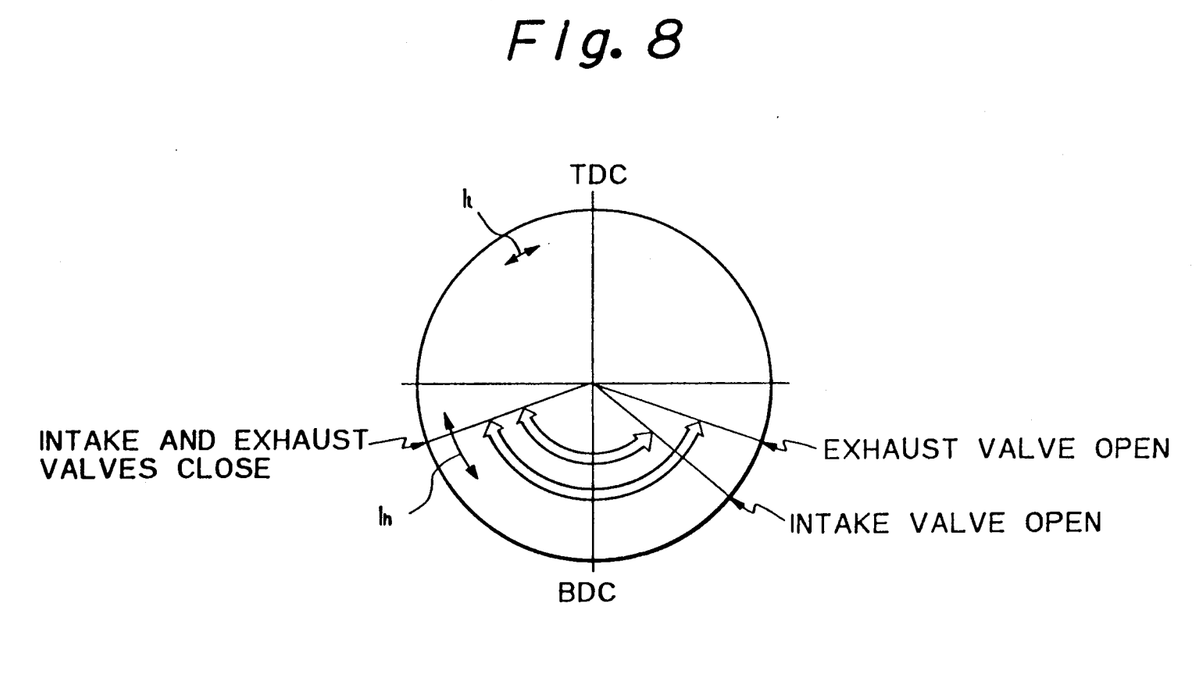
FIG. 8 is a diagram illustrating the opening time of an intake valve and an exhaust valve.

In addition, if the burned gas escapes less easily into the exhaust port 13 as mentioned above, the strength of the swirl motion X is slightly reduced. Consequently, in this case, when the engine is operating under a heavy load, all the fuel may be injected slightly before or after the exhaust valves 7 and the intake valves 6 are closed, as illustrated by Ih in FIG. 8. That is, the swirl motion X is relatively strong slightly before or after the exhaust valves 7 and the intake valves 6 are closed. In addition, if all of the fuel is injected slightly before or after the exhaust valves 7 and the intake valves 6 are closed, sufficient time is allowed for all of the injected fuel to be vaporized. Consequently, if all of the fuel is injected slightly before or after the exhaust valves 7 and the intake valves 6 are closed, the injected fuel is properly mixed with air, and the varization of the entire injected fuel is promoted.

Figure 9:
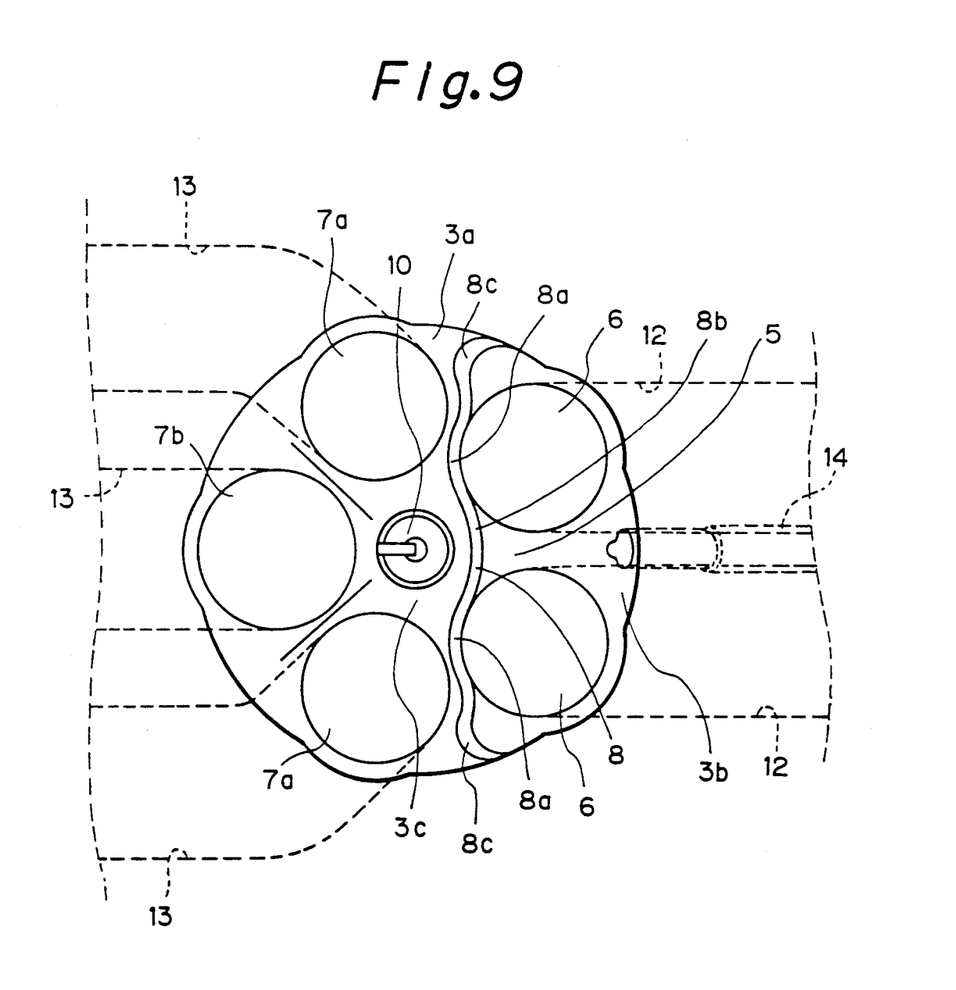
FIG. 9 is a view illustrating an inner wall of a cylinder head of another embodiment.

FIG. 9 illustrates another embodiment. In this embodiment, similar components are indicated by the same reference numerals used in FIG. 1 through 3.

As illustrated in FIG. 9, in this embodiment also the depression 5 is formed on the inner wall 3a of the cylinder head 3, and a pair of the intake valves 6 are arranged on the inner wall portion 3b of the cylinder head 3, which forms the bottom wall of the depression 5. The inner wall portion 3c of the cylinder head 3 other than the depression 5 is substantially flat and inclined, and three exhaust valves 7a, 7a, 7b are arranged on this inner wall portion 3c of the cylinder head 3. Among these three exhaust valves 7a, 7a, 7b, a pair of the exhaust valves 7a are arranged adjacent to the corresponding intake valves 6, and the third exhaust valve 7b is arranged at the periphery of the inner wall 3a of the cylinder head 3, between the exhaust valves 7a. Consequently, the exhaust valve 7b is farther from the intake valves 6 than the exhaust valves 6. The peripheral wall 8 of the depression 5 extends between the adjacent intake valve 6 and exhaust valve 7a and between the spark plug 10 and the intake valves 6. The masking walls 8a are arranged as close as possible to the peripheral portions of the corresponding intake valves 6 and extending archwise along the periphery of the corresponding intake valves 6. These masking walls 8a extend toward the combustion chamber 4 to a position lower than the intake valves 6 when the valves 6 are in the maximum lift position, and thus the valve opening between the valve seat and the peripheral portion of the intake valve 6, which is located on the exhaust valve 7a side, is masked by the corresponding masking wall 8a for the entire time for which the intake valve 6 is open.

Also in this embodiment, the exhaust valves 7a, 7a, 7b open earlier than the intake valves 6, and the exhaust valves 7a, 7a, 7b and the intake valves 6 are closed at substantially the same time.

In this embodiment, since the flow area of the valve openings of the exhaust valves 7a, 7a, 7b is increased, burned gas in the combustion chamber can easily escape into the exhaust ports 13, and as a result, since fresh air can easily flow into the combustion chamber, the amount of air fed into the combustion chamber is increased.

According to the present invention, since it is possible to prevent an abrupt attenuation of the swirl motion in the combustion chamber after the exhaust valves are closed, the vaporization of the injected fuel can be promoted. Consequently, it is possible to obtain a good ignition and accordingly, a good combustion.

While the invention has been described by reference to specific embodiments chosen for purposes of illustration, it should be apparent that numerous modifications could be made thereto by those skilled in the art without departing from the basic concept and scope of the invention.

What is claimed is:

1. A two-stroke engine comprising:
   a cylinder head having an inner wall;
   a piston having a top face, the inner wall of said cylinder head and the top face of said piston defining a combustion chamber therebetween;
   a pair of intake valves arranged on the inner wall of said cylinder head;
   a pair of exhaust valves arranged on the inner wall of said cylinder head;
   drive means for driving said intake valves and said exhaust valves to open said exhaust valves earlier than said intake valves and close said exhaust valves and said intake valves at substantially a same time;
   a masking wall formed on the inner wall of said cylinder head between said adjacent intake valve and exhaust valve to mask a valve opening of said each intake valve which is located at a side toward said adjacent exhaust valve side;
   a fuel injector arranged on the inner wall of said cylinder head to inject fuel into said combustion chamber;
   a third exhaust valve which is arranged on the inner wall of said cylinder head and is farther from said pair of intake valves than said pair of exhaust valves; and
   control means for controlling the injecting operation of said fuel injector.

2. A two-stroke engine according to claim 1, wherein said masking wall masks the valve opening of said intake valve, which is located on said exhaust valve side, for an entire time for which said intake valve is open.

3. A two-stroke engine according to claim 2, wherein said masking wall is arranged close to peripheral portion of said intake valve, which is located on said exhaust valve side, and extends downward, toward said piston to a position lower than said intake valve when said intake valve is in the maximum lift position thereof.

4. A two-stroke engine according to claim 1, wherein said masking wall extends in an arc along the peripheral portion of said intake valve.

5. A two-stroke engine according to claim 1, wherein said drive means comprises a cam driven by the engine for driving said exhaust valve, said cam having a first cam face portion and a second cam face portion on each side of a line passing through a rotation axis of said cam and a maximum lift point of said cam, said first cam face portion being used for opening said exhaust valve and said second cam face portion being used for closing said exhaust valve.

6. A two-stroke engine according to claim 5, wherein said first cam face portion and said second cam face portion have cam profiles which are substantially symmetrical with respect to said line.

7. A two-stroke engine comprising:
   a cylinder head having an inner wall;
   a piston having a top face, the inner wall of said cylinder head and the top face of said piston defining a combustion chamber therebetween;
   an intake valve arranged on the inner wall of said cylinder head;

an exhaust valve arranged on the inner wall of said cylinder head;

drive means for driving said intake valve and said exhaust valve to open said exhaust valve earlier than said intake valve and close said exhaust valve and said intake valve at substantially a same time;

a masking wall formed on the inner wall of said cylinder head between said intake valve and said exhaust valve to mask a valve opening of said intake valve, which is located on said exhaust valve side;

a fuel injector arranged on the inner wall of said cylinder head to inject fuel into said combustion chamber; and control means for controlling the injecting operation of said fuel injector, wherein said drive means comprises a cam driven by the engine for driving said exhaust valve, said cam having a first cam face portion and a second cam face portion on each side of a line passing through a rotation axis of said cam and a maximum lift point of said cam, said first cam face portion being used for opening said exhaust valve and said second cam face portion being used for closing said exhaust valve, said first cam face portion and said second cam face portion having cam profiles which are asymmetrical with respect to said line, and the cam profile of said second cam face portion is located inside the cam profile which is symmetrical with the cam profile of said first cam face portion with respect to said line.

8. A two-stroke engine comprising:

a cylinder head having an inner wall;

a spark plug arranged at a central portion of the inner wall of said cylinder head;

a piston having a top face, the inner wall of said cylinder head and the top face of said piston defining a combustion chamber therebetween;

an intake valve arranged on the inner wall of said cylinder head;

an exhaust valve arranged on the inner wall of said cylinder head;

drive means for driving said intake valve and said exhaust valve to open said exhaust valve earlier than said intake valve and close to said exhaust valve and said intake valve at substantially a same time;

a masking wall formed on the inner wall of said cylinder head between said intake valve and said exhaust valve to mask a valve opening of said intake valve, which is located on said exhaust valve side;

a fuel injector arranged on the inner wall of said cylinder head to inject fuel into said combustion chamber; and control means for controlling the injecting operation of said fuel injector, wherein said fuel injector is arranged on a peripheral portion of the inner wall of said cylinder head, and the top face of said piston has a depression extending from a point beneath said spark plug to a point beneath a tip portion of said fuel injector, said control means controlling an injection time of said fuel injector in response to an engine load, to inject fuel from said fuel injector toward a concave inner wall of said depression when the engine is operating under a light load and to advance the injection time when the engine is operating under a heavy load.

9. A two-stroke engine according to claim 8, wherein said control means controls the injection time to inject fuel at a time at which said fuel injected by said fuel injector and moving along an axis of injection impinges obliquely upon the concave inner wall of said depression at an acute angle, to thereby cause an impinged fuel to flow along the concave inner wall of said depression toward the point beneath said spark plug due to an inertia thereof when the engine is operating under a light load.

10. A two-stroke engine according to claim 8, wherein said control means controls the injecting operation to inject fuel twice when the engine is operating under a heavy load, a first injection being carried out approximately at a time when said intake valve and said exhaust valve are closed, and a second injection being carried out later than said first injection to direct fuel toward the concave inner wall of said depression.

11. A two-stroke engine according to claim 10, wherein said control means controls the injection time of said second injection to inject fuel at a time at which fuel injected by said fuel injector and moving along an axis of injection impinges upon the concave inner wall of said depression at substantially a right angle.

12. A two-stroke engine according to claim 8, wherein said control means controls the injection time to inject fuel approximately at a time when said intake valve and said exhaust valve are closed when the engine is operating under a heavy load.

13. A two-stroke engine according to claim 8, wherein the concave inner wall of said depression has a substantially spherical shape.

14. A two-stroke engine according to claim 13, wherein the concave inner wall of said depression has a symmetrical shape with respect to a vertical plane including both said spark plug and said fuel injector.

15. A two-stroke engine according to claim 14, wherein an axis of injection is located in said vertical plane.

16. A two-stroke engine according to claim 14, wherein the top face of said piston has therein a recessed portion which is located in said vertical plane beneath said spark plug, and said recessed portion is open to an upper interior of said depression.

17. A two-stroke engine according to claim 16, wherein said recessed portion has a substantially spherical shape having a radius of curvature which is smaller than that of said depression.

18. A two-stroke engine according to claim 16, wherein said spark plug enters said recessed portion when said piston reaches top dead center.

19. A two-stroke engine according to claim 8, wherein the top face of said piston and the inner wall of said cylinder head defines a squish area therebetween on an opposite side of said depression.

* * * * *